Figure 1:
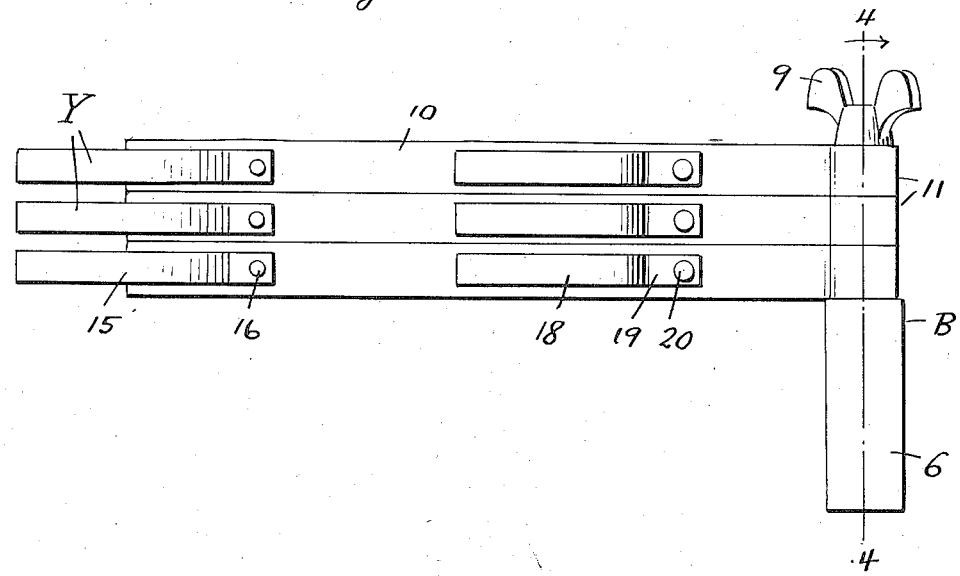

Jan. 14, 1936.　　　　O. E. HAIR　　　　2,027,772
FISHING POLE HOLDER
Filed April 12, 1935　　　2 Sheets-Sheet 1

Inventor

Otto E. Hair

By Clarence A. O'Brien
　　　　　　Attorney

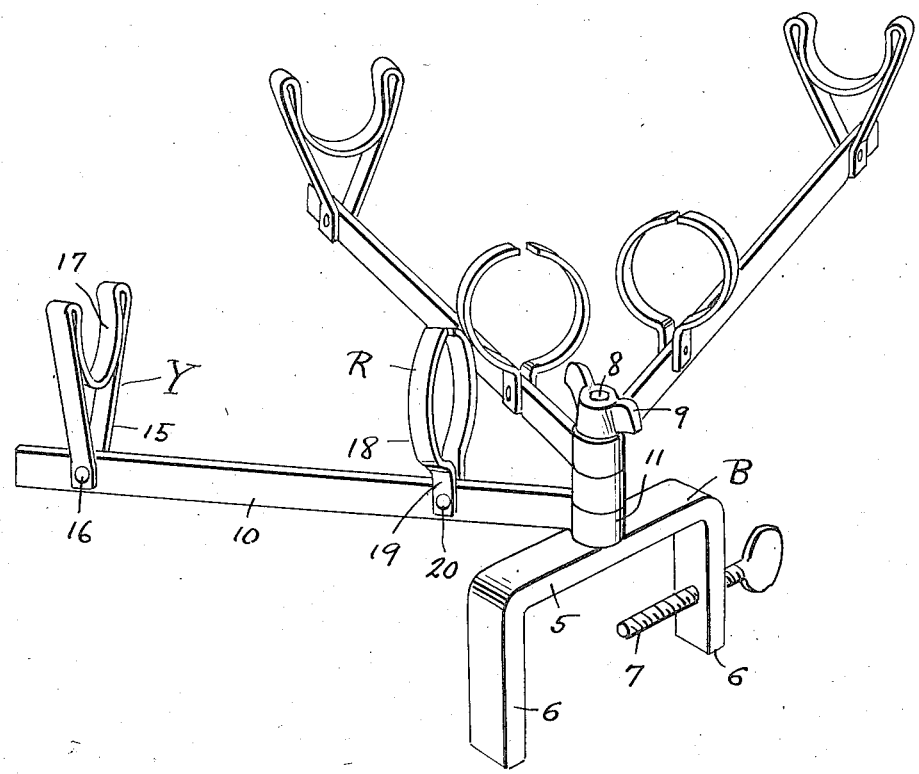
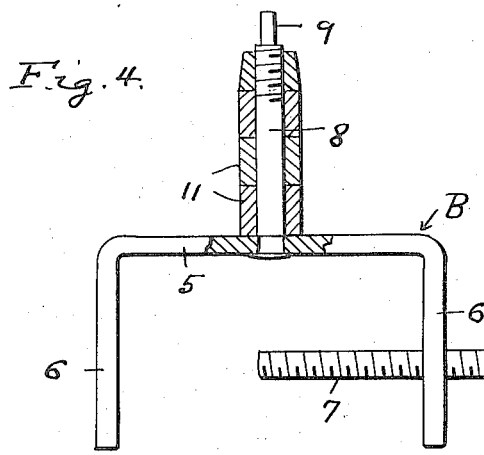
Fig. 3.
Fig. 4.
Inventor
Otto E. Hair

Patented Jan. 14, 1936

2,027,772

UNITED STATES PATENT OFFICE 2,027,772

FISHING POLE HOLDER

Otto E. Hair, Milwaukee, Wis.

Application April 12, 1935, Serial No. 16,082

2 Claims. (Cl. 248—39)

The present invention relates to a fishing pole holder and has for its prime object to provide means whereby a plurality of fishing poles may be held by a single holder in an effective and efficient manner.

Another very important object of the invention resides in the provision of a fishing pole holder of this nature which is simple in its construction, comparatively inexpensive to manufacture, easy to manipulate and adjust, capable of being folded in a compact manner when not in use, and thoroughly reliable in use.

With the above and numerous other objects in view as will appear as the description proceeds, the invention consists in certain novel features of construction, and in the combination and arrangement of parts as will be hereinafter more fully described and claimed.

Figure 2:
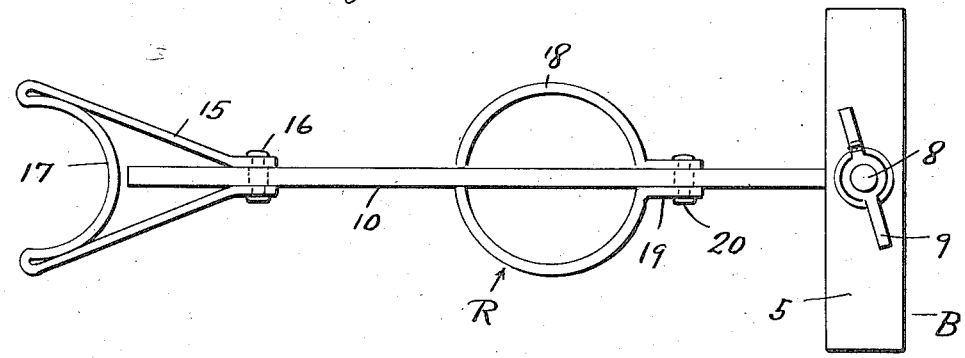

In the drawings:

Figure 1 is a side elevation of the holder showing the elements thereof in folded position, Figure 2 is a top plan view thereof with the elements in folded position, Figure 3 is a perspective view of the holder showing the elements in extended position, Figure 4 is a detail section taken substantially on the line 4—4 of Figure 1.

Referring to the drawings in detail it will be seen that the letter B denotes generally an inverted U-shaped bracket including a cross member 5 with depending legs 6. The cross member 5 is adapted to rest on the rail of a fishing boat with the legs 6 straddling the same and a set screw 7 is threaded through one of the legs for securing the bracket in place. Rising from the central portion of the cross member 5 is a bolt 8 having a thumb nut 9 threaded on the upper end thereof.

There are a plurality of arms 10 adjacent ends of which are provided with collars 11 superimposed on one another and rockable about the bolt 8. Thus the arms may be swung to folded or co-planar position as shown in Figures 1 and 2 or may be adjusted to angular position as shown in Figure 3 and the thumb nut may be loosened to permit such adjustment and tightened to hold the arms in said adjusted positions.

On each arm there is the yoke Y adjacent the free end thereof and a split ring R adjacent the other end thereof. Each yoke Y comprises a pair of upwardly diverging legs 15 the lower ends of which are swingable on the bars 10 by means of pins or rivets or other suitable means 16. The upper ends of the legs merge into a saddle 17 which extends down between the legs.

Each ring R comprises a pair of semicircular sections 18 the lower ends of which merge into ears 19 swingable on pins, rivets or the like 20 mounted in the bars 10. The upper ends of the sections 18 are slightly spaced substantially a distance equal to the thickness of the bars 10 so that they may be swung to the position shown in Figure 1 when the bars are in folded or co-planar position.

It is thought that the utility of the holder will be quite apparent without a more detailed description thereof except to say that a pole has an intermediate portion resting in the saddle 17 while the handle end thereof extends through the split ring.

The present embodiment of the invention has been described in considerable detail merely for the purpose of exemplification. It is to be understood that numerous changes in the details of construction may be resorted to without departing from the spirit and scope of the invention as hereinafter claimed.

Having thus described the invention, what is claimed as new is:

1. A fishing pole holder comprising a clamping member, a vertically arranged pivot pin carried by said member, an arm having a collar at one end fitting over the pin, means for holding the arm in adjusted position on the pin, a yoke member including a pair of arms and a bight, the said bight being bowed inwardly between the arms to form a seat for a fishing pole and the arms converging from their junctions with the bight to the free ends, said free ends being pivoted to the free end portion of the pivoted arm at a point spaced from the free end of the arm a distance less than the distance between the bight and the pivotal point whereby the yoke member can be swung to a horizontal position when not in use and a holder member pivoted to an intermediate part of the arm and composed of two substantially semi-circular portions having their ends spaced apart whereby said holder can be swung into a horizontal position with the two parts at the sides of the arm or to a vertical position to hold a portion of the rod.

2. In a fishing pole holder, an arm, a yoke member including a pair of arms and a bight, the bight being bowed inwardly between the arms of the yoke member to form a seat for a fishing pole and the arms of the yoke member converging from their junctures with the bight to the free ends, said free end being pivoted to one end portion of the first mentioned arm at a point spaced from the free end of said first mentioned arm a distance less than the distance between the bight and the pivotal point whereby the yoke member can be swung to a horizontal position when not in use, and a holder member pivoted to an intermediate part of the first mentioned arm and composed of two substantially semi-circular portions having their free ends spaced apart whereby said holder can be swung into a horizontal position with the two parts at the sides of first mentioned arm or to a vertical position to hold a part of the rod.

OTTO E. HAIR.